Nov. 1, 1960     A. H. OSBORNE     2,958,399
SYSTEM FOR COOLING KINETIC-ENERGY-ABSORBING DEVICES
Filed April 12, 1956     3 Sheets-Sheet 1

INVENTOR.
ALBERT H. OSBORNE
BY John A. Young
ATTORNEY

INVENTOR.
ALBERT H. OSBORNE
BY John A. Young
ATTORNEY

Nov. 1, 1960 A. H. OSBORNE 2,958,399
SYSTEM FOR COOLING KINETIC-ENERGY-ABSORBING DEVICES
Filed April 12, 1956 3 Sheets-Sheet 3

INVENTOR.
ALBERT H. OSBORNE
BY John A. Young
ATTORNEY

United States Patent Office 2,958,399
Patented Nov. 1, 1960

2,958,399

SYSTEM FOR COOLING KINETIC-ENERGY-ABSORBING DEVICES

Albert H. Osborne, South Bend, Ind., assignor to The Bendix Corporation, a corporation of Delaware Filed Apr. 12, 1956, Ser. No. 577,806

5 Claims. (Cl. 188—72)

This invention relates to a system for cooling kinetic-energy-absorbing devices such as brakes.

It is an object of this invention to obtain a cooling system which is particularly useful for aircraft brakes. It is required that the system be both compact and lightweight and yet capable of efficiently extracting heat energy from the brake so that the capacity and service life of the brake is increased.

It is a further object of the invention to devise a method for cooling the brake which incorporates a series of steps for removing the braking heats which are generated during a braking application.

It is a further object of the invention to adapt parts of the brake to form a part of the cooling system, with the result that only a relatively few number of elements need be added to a conventional braking system to make up the cooling system. In keeping with this object, it is my intention to adapt one or more of the stator keys as an ejecting mechanism for the coolant.

It is a further object of the invention to break up the liquid coolant into minute droplets so that it may best be utilized for extracting heat as rapidly and efficiently as possible.

It is also an object of the invention to provide cooling of the brake without substantially detracting from the performance of the brake or causing deterioration of the brake parts.

One of the serious complications of braking is the high heat which is generated during the brake application. The problem of dissipating braking heat is especially troublesome in aircraft braking where the landing speeds and sizes of the aircraft have steadily increased. The high temperatures encountered in aircraft brakes are adverse to the operation of the brake, causing a change in effectiveness, deterioration of the lining and brake parts, boiling of the hydraulic fluid, distortion of the brake parts, and a number of other difficulties.

One promising solution to the brake heat problem lies in circulation of a coolant through the brake to extract heat. Most cooling systems involve direct ejection of a stream of coolant against the brake parts, or else cooling liquid is circulated through the interior of parts of the brake. Most of these cooling systems are unsatisfactory either because they are too expensive or impractical from a design standpoint, or else they do not extract heat at a sufficient rate to improve brake performance.

I propose, therefore, to improve upon previous cooling systems with a method and system which is particularly useful in aircraft braking but by no means limited thereto. Other objects and features of this invention will become apparent from a consideration of the following description which proceeds with reference to the accompanying drawings, wherein.

Figure 1:
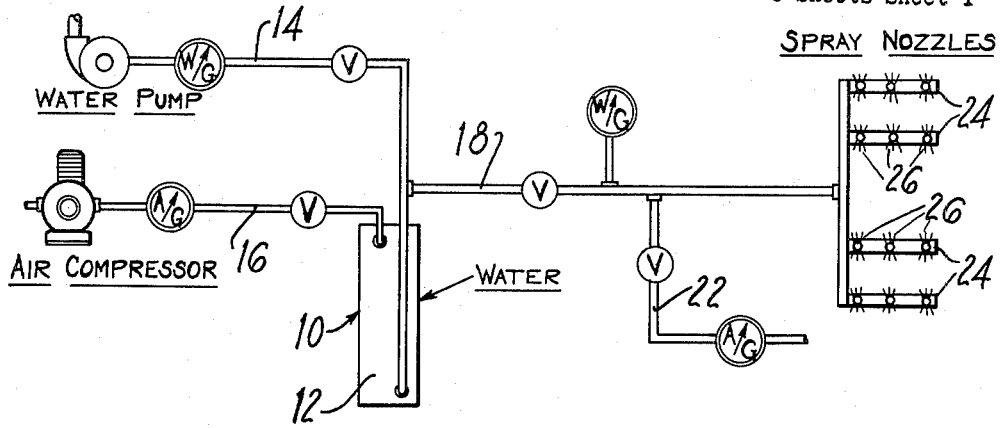
Figure 1 is a schematic view of the fluid distributing system.

Referring to Figure 1, the cooling system includes a reservoir 10 wherein the liquid coolant 12 is stored. I have found that water is a satisfactory coolant but other coolants such as liquefied carbon dioxide may be used, depending upon design requirements. A supply line 14 leads to the reservoir to replenish the liquid in the reservoir. Air pressure line 16 opens into the reservoir and creates sufficient pressure to force the liquid from the reservoir and through line 18 toward the brake 20. A second pressure line 22 is fitted to the distributing line 18 to force the liquid under high pressures into the stator keys 24' where it is converted into a fine spray 26 which is ejected within the brake. Valves of either the manually actuated or check valve type are provided in the conduits 14 and 16 to prevent backflow through the respective conduits and to permit separate actuation of the liquid replenishing means and the means for forcing the liquid towards the brake.

Figure 3:
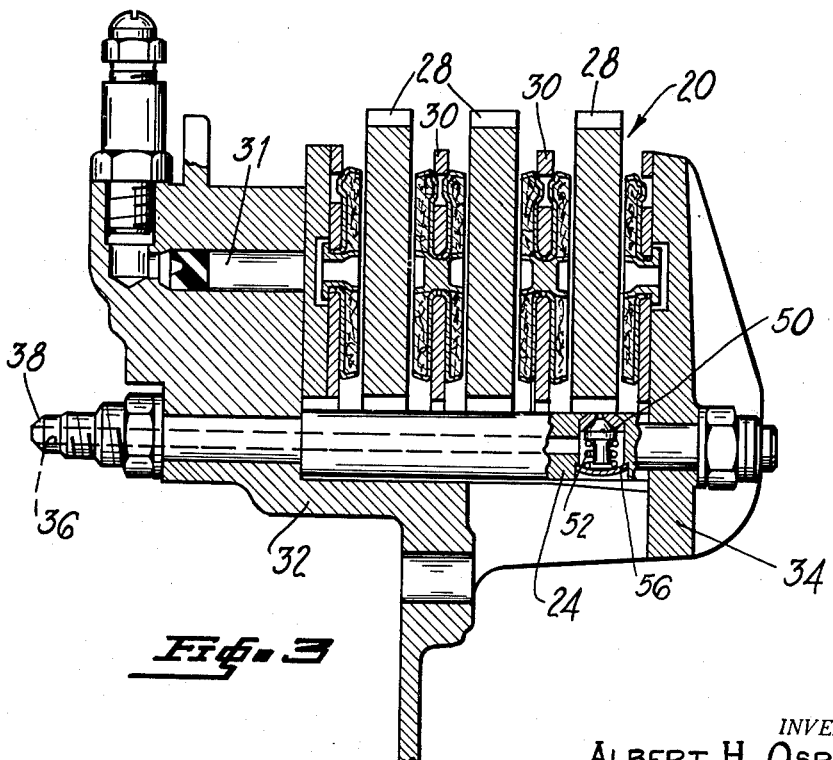
Figure 3 is a section view taken on line 3—3 of Figure 2.
Figure 2:
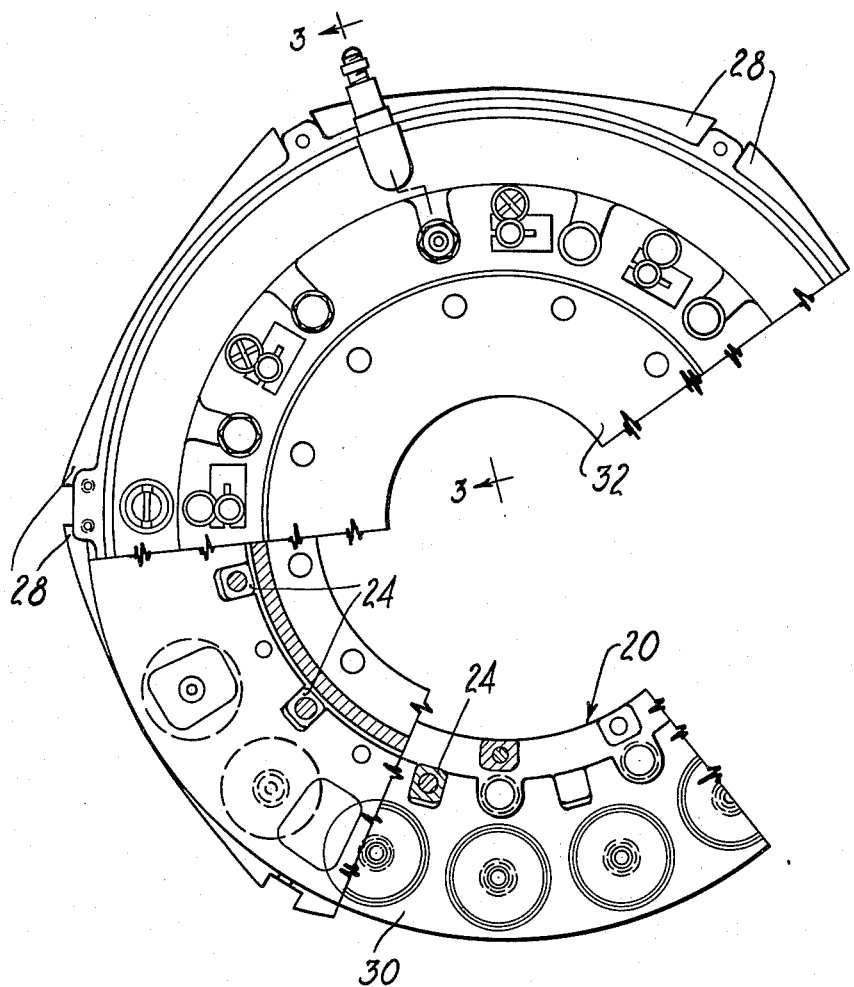
Figure 2 is a partial plan view of a disk brake which is provided with the invention.

Referring to Figures 2 and 3, the brake which is designated generally by reference numeral 20 consists of a plurality of interleaved rotors 28 and stators 30, which are forced together into frictional engagement by a fluid motor 31. The rotors 28 are keyed to a rotatable wheel in a manner permitting axial movement thereof. The stators are splined to keys 24 which are fixed at opposite ends to a carrier 32 and reaction plate 34. The stator keys are circumferentially spaced around the brake. The number of these stator keys is dictated by the size and torque requirements of the brake.

Certain of the stator keys, designated as cooling keys, form a part of the cooling system. Assuming a typical disk brake, in which twelve stator keys are provided, I have found that four equally spaced cooling keys are satisfactory for cooling the brake.

Figure 4:
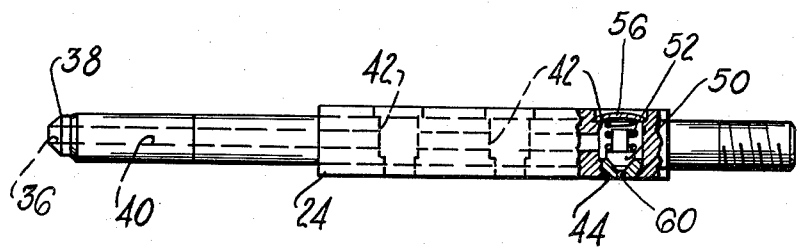
Figure 4 is a detail view (shown partly in section) of a stator key which forms part of the cooling system.
Figure 5:
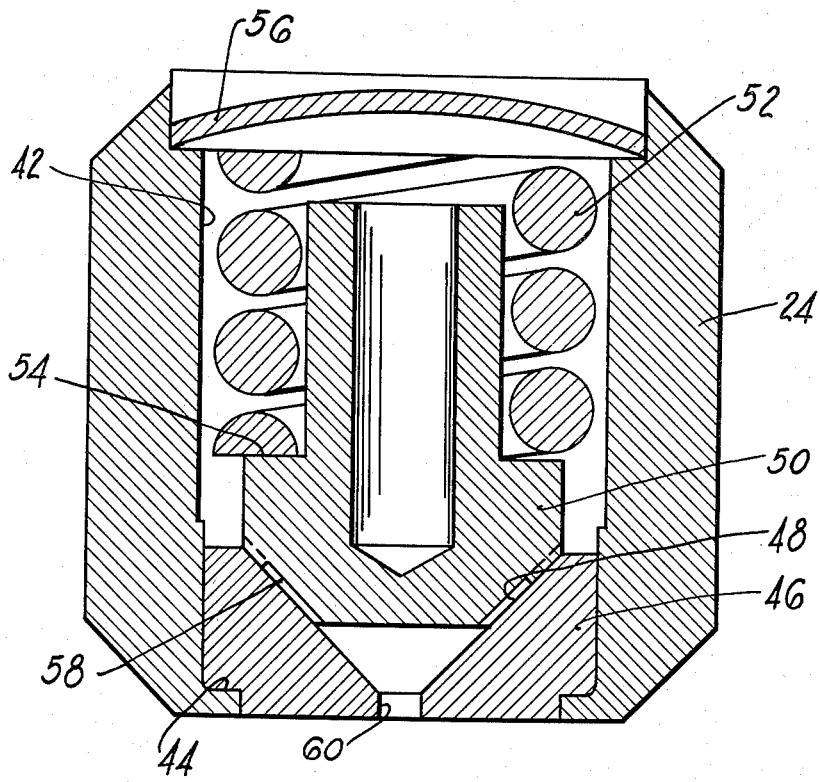
Figure 5 is an enlarged view of the discharge mechanism which converts the coolant into a fine spray which is circulated into the brake.

Referring to Figure 4, the stator key 24 has an inlet port 36 having a fluid coupling 38 which is connected with the distributing line 18 (Figure 1). The key has a longitudinal bore 40 and four transverse bores 42. The transverse bore 42 is stepped in order to provide a shoulder 44. Referring to the enlarged detail view (Figure 5), a valve seat 46 bears against the shoulder 44 and has a frusto-conical surface 48 which is formed around the interior surface thereof. A distributor 50 is urged against the surface 48 of the valve seat by a spring 52 which is compressed between a shoulder 54 of the distributor and a plug 56 which seals the one end of transverse bore 42. A number of spirally shaped grooves 58 are formed in the outer surface of the valve element 50 to conduct fluid which is forced under pressure from the interior of the transverse bore 42 and through the outlet orifice 60. These grooves 58 are constructed to convert the liquid into a fine spray 26 which is ejected through the outlet orifice 60 and into the brake proper where it extracts the braking heat through vaporization thereof.

Because the liquid coolant (for example, water) is dissipated in the form of a fine spray, it has a high surface/volume ratio and thus readily absorbs the braking heat which converts the spray into gaseous vapor. The latent heat of vaporization reduces the braking temperature. The vapor (steam, in the event water is used) passes through the many clearances of the brake to the exterior of the brake.

In operation, the cooling system may be actuated either responsively to the development of hydraulic pressure which applies fluid motor 31, or else the operation of the cooling system may be initiated responsively to certain temperature sensing devices in the brakes such as thermocouples. Whatever the control system adopted, the basic brake cooling principles remain the same.

At the start of the cooling operation, fluid is forced from the reservoir 10 through the distributing system to the cooling stator keys. The pressure in line 22 forces the liquid through the longitudinal bore 40 and into each of the transverse bores 42 where it is then atomized in passing through the distributor 50 and ejected in a fine spray into the brake. The spray of liquid is converted into a gaseous state as before described, and in doing so it extracts a part of the braking heat to cool the brake.

It is to be understood that the particular construction of the distributor 50 forms no essential part of the invention. Many different distributors have been satisfactorily used in converting the liquid coolant to a fine spray and it is not deemed necessary to disclose these alternate embodiments to substantiate the breadth of the invention.

It forms an important part of this invention that the liquid coolant is changed from liquid to minute droplets in order to serve as a more efficient cooling medium.

With brakes larger than the ones disclosed, it is possible to increase the length of the cooling stator key and provide additional orifices which increase the number of cooling sprays that are ejected into the brake. It is assumed that those skilled in the art may make such changes by applying the general principles disclosed herein.

Although a specific embodiment of the invention has been disclosed herein, this is only exemplary of the invention and it is not considered to be restrictive thereof.

I claim:

1. A system for cooling brakes comprising a liquid reservoir, means for replenishing the reservoir with a liquid coolant, conduit means for conducting the coolant from the reservoir to said brake, means for forcing the coolant toward the brake under pressure, a brake carrier, a reaction plate, including a plurality of separate hollow stator keys operatively connected to said conduit means arranged circumferentially about the axis of the brake and removably secured independently of one another between said carrier and said reaction plate, and a plurality of atomizers spaced uniformly and internally along the length of said keys which discharge a fine spray of coolant into the brake cavity to extract heat therefrom.

2. A fluid cooling system for brakes comprising a reservoir for storing a fluid coolant, conduit means for conducting the fluid from said reservoir to the brakes, a brake carrier, a reaction plate, means for subjecting the coolant to pressure before it enters the brake, at least one tubular shaped stator key operatively connected to said conduit means removably secured to said carrier and said reaction plate for holding said carrier and said reaction plate in fixed axial relation, and at least one atomizer orifice contained internally within said stator key and arranged so that liquid ejected from said orifice will be directed towards said brake, said coolant flowing through said hollow stator key to said orifice from which the coolant is ejected in the form of a fine spray, and spray passes through the brake to extract heat therefrom.

3. In a disk brake having a carrier and a reaction plate, a plurality of interleaved rotors and stators and at least one stator key which forms a part of a cooling system for the brake, said stator key comprising a tubular member having an open end portion and a closed end portion and at least one opening intermediate said end portions which extends radially outward through the wall of said tubular member and opens into fluid communication with said plurality of stators and rotors, said tubular member being arranged between the carrier and the reaction plate with said end portions extending through the carrier and the reaction plate, fastening means threadedly engaged with the end portions for holding the carrier and reaction plate in axially spaced relation, means for supplying fluid under pressure to said open end portion and valve means disposed in said opening for controlling the flow of pressurized fluid therethrough such that the fluid is discharged into the brake in the form of a fine spray which passes through the brake to extract heat therefrom.

4. In a disk brake having a carrier and a reaction plate, a plurality of interleaved rotors and stators and a plurality of stator keys which form part of a cooling system for the brake, said stator keys being arranged circumferentially about the axis of the brake, said stator keys each comprising a tubular member having an open end portion and a closed end portion and a plurality of spaced openings intermediate said end portions which extend radially outward through the wall of said tubular member and open into fluid communication with said plurality of rotors and stators, said tubular member being disposed between the carrier and reaction plate with said end portions extending through said carrier and said reaction plate fastening means threadedly engaged with the closed and open end portions for holding the carrier and reaction plate in axially spaced relation, means for supplying fluid under pressure to said open end portion, and valve means disposed in said openings for controlling the flow of pressurized fluid therethrough such that the fluid is discharged into the brake in the form of a fine spray which passes through the brake to extract heat therefrom.

5. In a disk brake having a carrier and a reaction plate, a plurality of interleaved rotors and stators and at least one stator key connected to a source of fluid under pressure which forms part of a cooling system for the brake, said stator keys comprising a tubular member connected at one end to said source of fluid, a plurality of spaced outlet orifices disposed along the length of said tubular member for communicating fluid from the interior of said tubular member to said plurality of interleaved rotors and stators, a valve seat and a valve member engageable therewith located in each of said outlet orifices, said valve element having curved passages in the seating surface thereof to provide fluid egress therethrough and out said outlet orifice where it is discharged in the form of a fine spray which is dissipated to said interleaved rotors and stators, and a spring maintaining said valve element against said valve seat.

References Cited in the file of this patent

UNITED STATES PATENTS

| 2,055,864 | Harsch | Sept. 29, 1936 |
| 2,127,557 | Ells | Aug. 23, 1938 |
| 2,378,100 | Pogue | June 17, 1945 |
| 2,400,225 | Eksergian | May 14, 1946 |
| 2,486,144 | Frank | Oct. 25, 1949 |
| 2,620,900 | Rostu | Dec. 9, 1952 |
| 2,803,764 | Lundskow | Aug. 20, 1957 |
| 2,821,437 | Leshner | Jan. 28, 1958 |
| 2,857,992 | Rappaport | Oct. 28, 1958 |

FOREIGN PATENTS

| 454,102 | Great Britain | Sept. 24, 1936 |
| 739,244 | Great Britain | Oct. 26, 1955 |